United States Patent

Chin et al.

[11] Patent Number: 5,929,619
[45] Date of Patent: Jul. 27, 1999

[54] SYSTEM AND METHOD FOR STABILIZING AN AUTOMOTIVE ALTERNATOR VOLTAGE REGULATOR WITH LOAD RESPONSE CONTROL

[75] Inventors: Cheng Hsi Chin; George J. Chen, both of Taipei, Taiwan

[73] Assignee: Victory Industrial Corporation, Taipei Hsine, China

[21] Appl. No.: 09/064,712

[22] Filed: Apr. 22, 1998

[51] Int. Cl.$^6$ ........................................... G05F 1/40
[52] U.S. Cl. ........................................ 323/283; 323/285
[58] Field of Search ................................ 323/282, 283, 323/284, 285

[56] References Cited

U.S. PATENT DOCUMENTS

| | | | |
|---|---|---|---|
| 3,859,582 | 1/1975 | Kautz et al. | 323/283 |
| 4,636,706 | 1/1987 | Bowman et al. | 322/28 |
| 4,672,518 | 6/1987 | Murdock | 323/285 |
| 4,749,935 | 6/1988 | Osborne | 322/8 |
| 4,777,425 | 10/1988 | MacFarlane | 322/28 |
| 4,920,308 | 4/1990 | Edwards et al. | 322/58 |
| 4,931,717 | 6/1990 | Gray et al. | 323/299 |
| 4,931,751 | 6/1990 | Keller et al. | 332/108 |
| 4,962,348 | 10/1990 | Edwards | 322/58 |
| 4,992,672 | 2/1991 | Norton | 307/10.1 |
| 5,166,538 | 11/1992 | Norton | 307/10.1 |
| 5,216,350 | 6/1993 | Judge et al. | 322/25 |
| 5,225,764 | 7/1993 | Falater | 322/28 |
| 5,298,851 | 3/1994 | DeNardis | 322/28 |
| 5,502,368 | 3/1996 | Syverson et al. | 322/28 |
| 5,625,276 | 4/1997 | Scott et al. | 322/24 |
| 5,631,544 | 5/1997 | Syverson et al. | 322/46 |
| 5,656,922 | 8/1997 | LaVelle et al. | 322/46 |
| 5,675,240 | 10/1997 | Fujisawa et al. | 323/282 |

*Primary Examiner*—Peter S. Wong
*Assistant Examiner*—Bao Q. Vu
*Attorney, Agent, or Firm*—Townsend & Townsend & Crew LLP

[57] ABSTRACT

A voltage regulator having improved noise immunity includes a reference counter, a digital reference generator coupled to the reference generator, a comparator coupled to the digital reference generator, a load response control circuit coupled to the comparator output, a digital pulse width memory circuit coupled the load response control output, and a digital pulse width timer circuit coupled to the pulse width memory output and to the load response control circuit, wherein the digital pulse width timer circuit and the digital pulse width memory circuit each have greater digital resolution than the digital reference generator.

18 Claims, 5 Drawing Sheets

SYSTEM AND METHOD FOR STABILIZING AN AUTOMOTIVE ALTERNATOR VOLTAGE REGULATOR WITH LOAD RESPONSE CONTROL

BACKGROUND OF THE INVENTION

This invention relates to a generator voltage regulating system and more particularly to a system and method used to stabilize the voltage regulating system using load response control.

Voltage regulating systems are used in many applications to hold an electrical system's operating voltage within a predefined window. The voltage regulator system is particularly useful in applications, such as automobiles, where the system voltage must remain within a predefined window, but the electrical load may vary, for instance when the operator turns on or off different accessories in the vehicle. The voltage regulator allows the vehicle to operate within a system voltage window (typically 12–15 V) while providing varying levels of power to run all of the accessories requested by the operator.

FIG. 1 illustrates a simplified electrical system 100 used in many automobiles. The system includes a battery 110, an electrical load 120, a voltage regulator 140, and an alternator 160. By means of a crankshaft 170, the vehicle's engine 180 operates to spin a rotating coil in close proximity to stationary coil enclosed within the alternator 160, thereby inducing a current within the stationary coil of the alternator 140. The induced current is then rectified and delivered to the load 120 or to the battery 110 when needed.

The voltage regulator 140 holds the operating voltage of the electrical system 100 within a specific range, typically 13–15 VDC by controlling the amount of current the alternator 160 supplies to the system 100. The voltage regulator 140 senses the system's voltage and varies the alternator output current accordingly to keep the electrical system's voltage within the desired operating range. When the amount of current required for the vehicle's operation changes, for instance when the operator activates the climate control or when the battery 110 is in need of recharging, the voltage regulator 140 controls the alternator 160 to deliver more current so that the system voltage remains within the desired range. Similarly, the voltage regulator 140 controls the alternator to deliver less current when required, for instance when an accessory is de-activated.

Automotive vehicles are electrically very noisy environments and the described voltage regulator system is susceptible to noise occurring at the input of the voltage regulator 140. When this occurs, the noise can cause severe fluctuations in the amount of current supplied to the electrical system, resulting in spontaneous engine acceleration or stalling.

One technique for stabilizing the voltage regulator and improving the voltage regulator's noise immunity is to increase the resolution of digital to analog converters (DACs) implemented within the voltage regulator. However, there is a substantial cost incurred in increasing the bit resolution in DACs, for instance from an 4-bit DAC to an 8-bit DAC. What is needed is a low cost system and method for reducing the amount of noise induced effects of the voltage regulator.

SUMMARY OF THE INVENTION

The present invention provides a low cost method and system for reducing the noise-induced effects of a voltage regulator system. In one embodiment, a voltage regulator of the present invention includes a reference counter, a digital reference generator coupled to the reference generator, a comparator coupled to the digital reference generator, a load response control circuit coupled to the comparator output, a digital pulse width memory circuit coupled the load response control output, and a digital pulse width timer circuit coupled to said pulse width memory output and to the load response control circuit, wherein said digital pulse width timer circuit and said digital pulse width memory circuit each have greater digital resolution than said digital reference generator.

DESCRIPTION OF THE PREFERRED EMBODIMENT

Figure 1:
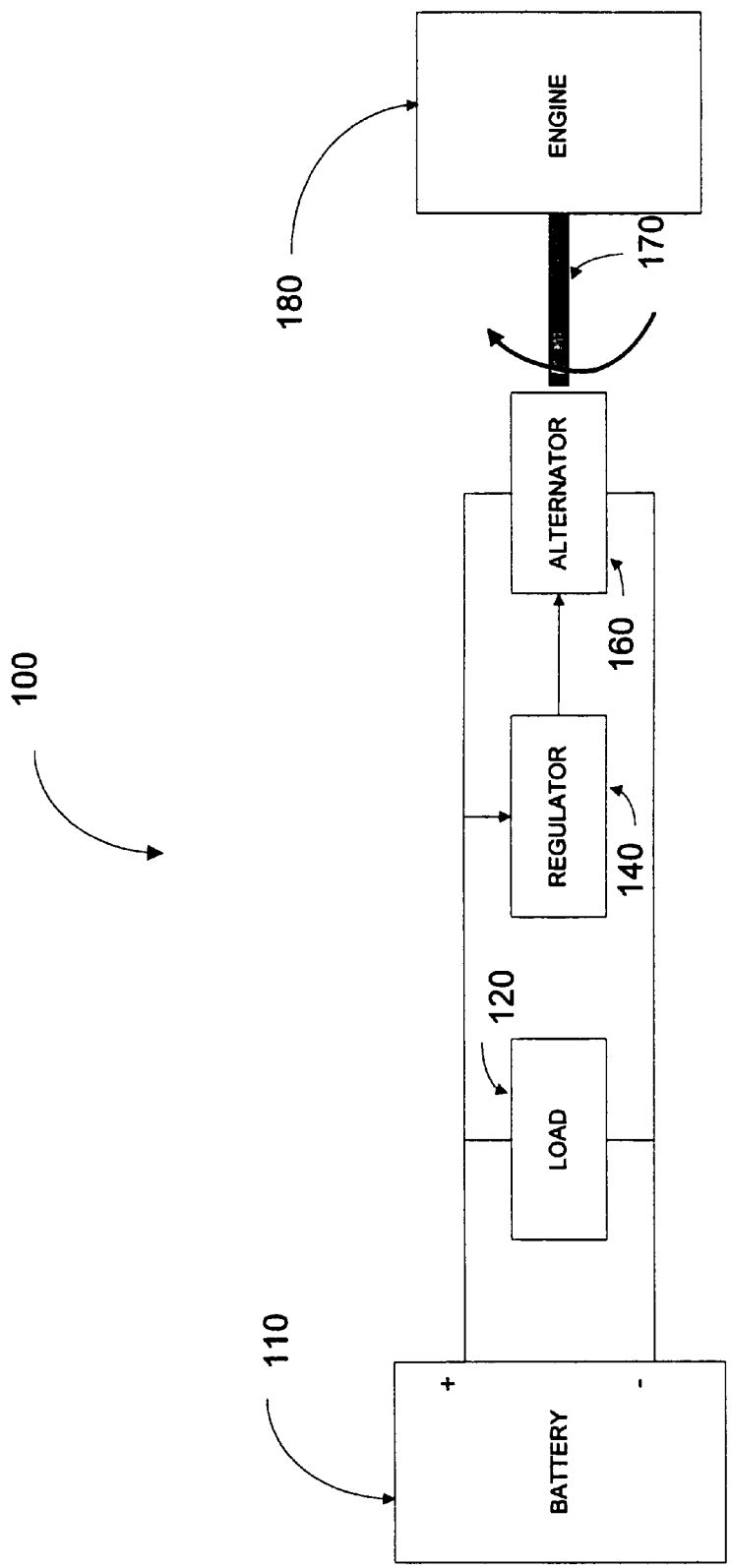
FIG. 1 shows a circuit block diagram of an automotive electrical system.
Figure 2:
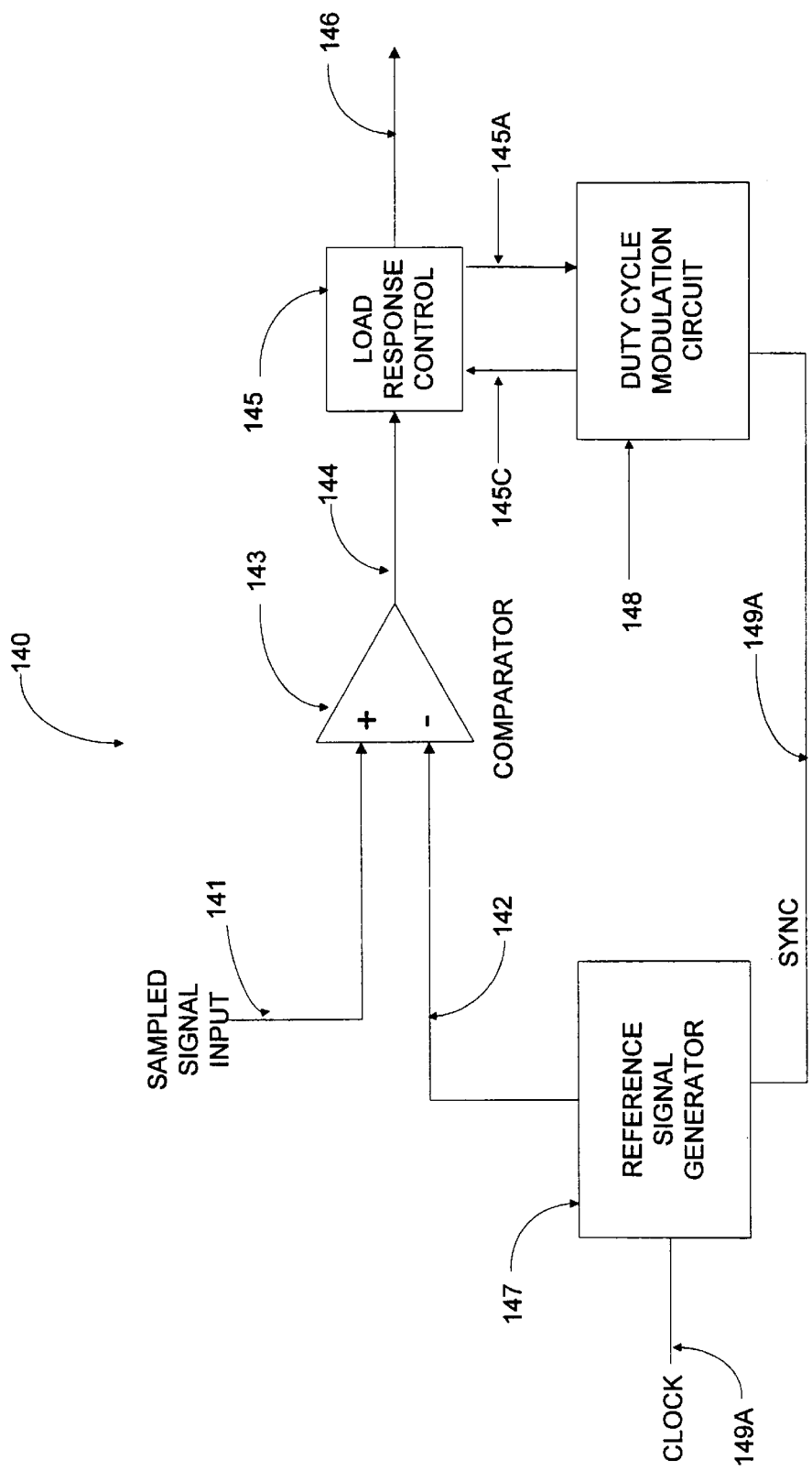
FIG. 2 shows the circuit block diagram of an automotive voltage regulator.

FIG. 2 illustrates a simplified circuit block diagram of the voltage regulator 140. The voltage regulator 140 includes an input for sampling the system's voltage level 141, a reference signal generator 147, a comparator 143, a load response control (LRC) circuit 145, and a duty cycle modulation circuit 148.

Figure 3:
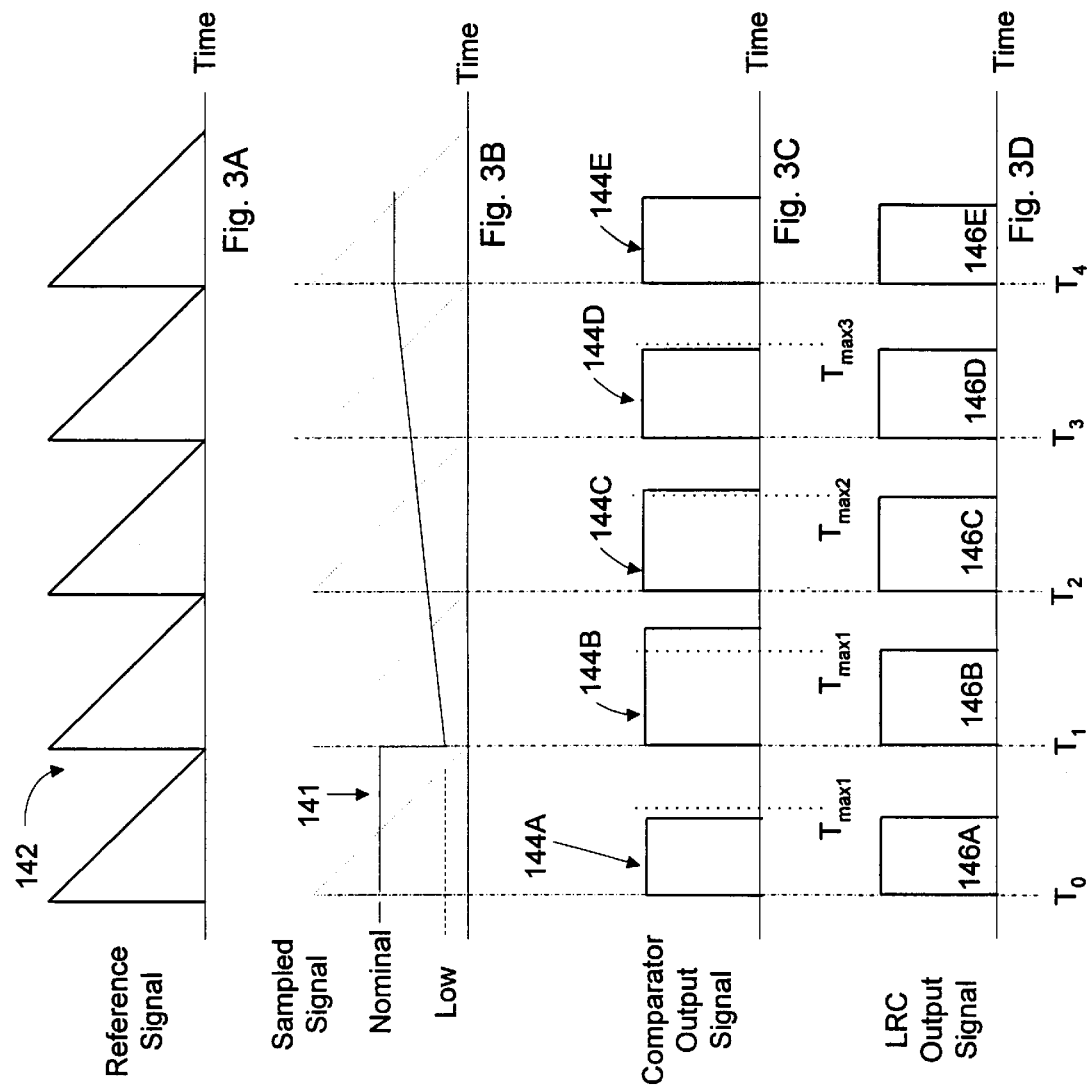
FIG. 3A shows a ramp signal produced in the voltage regulator shown in FIG. 2.
FIG. 3B shows a sampled signal of the electrical system monitored of the voltage regulator shown in FIG. 2.
FIG. 3C shows a pulse-width modulated signal produced in the voltage regulator shown in FIG. 2.
FIG. 3D shows an output signal of the voltage regulator shown in FIG. 2.

During operation, the reference signal generator 147 generates a ramp signal 142, shown in FIG. 3A. The frequency of the ramp signal 142 is set to be much greater than the response time of the alternator and is typically 75 Hz (13 mS period). The reference signal generator and the duty cycle modulation circuit are coupled via a sync line 149A to provide synchronous operation.

The voltage level of the electrical system is monitored via a sampled signal 141. The amplitude of the sampled signal 141 may fluctuate over time due to changes in the electrical load 120, for instance when an accessory is activated or deactivated. FIG. 3B shows the sampled signal 141 having a momentary decrease in its amplitude at time $T_0$ due to an increased load 120. At time $T_4$ the sampled signal 141 displays an increase due to a decrease in the electrical load, for instance when an accessory is de-activated.

Referring now to FIG. 2, the sampled signal 141 and the reference signal 142 are supplied to the non-inverting and inverting inputs of the comparator 143, respectively. In response, the comparator 143 produces an output signal 144, which is a pulse-width modulated signal, shown in FIG. 3C. As can be seen from FIGS. 3B and 3C, the duty cycle ("on time") period of the pulse-width modulated signal 144 is inversely proportional to the amplitude of the sampled signal 141. Thus, when the amplitude of the sampled signal 141 decreases, the duty cycle period of the comparator's output signal 144 increases. Conversely, when the amplitude of the sampled signal 141 increases, the comparator's duty cycle period decreases.

The comparator's duty cycle period is used to return the system voltage to it nominal operating range. When the amplitude of the sampled signal 141 is below the nominal range, the comparator generates an output signal 144 having a longer duty cycle period. The longer duty cycle period is used to activate the alternator 160 for a longer period of time. Consequently, the alternator 160 supplies more current to the electrical system, satisfying the increased electrical load, and returning the electrical system 100 to it nominal operating range. When the amplitude of the sampled signal 141 is higher than the nominal range, the comparator 143 produces a output signal 144 having a shorter duty cycle period. The shorter duty cycle period activates the alternator 160 for a shorter period time, thereby supplying less current to the load which serves to decreasing the system voltage level.

However, large changes in current supplied to the electrical system could stall the vehicle or damage the electrical system. To prevent this, a load response control (LRC) circuit 145 and a duty cycle modulation (DCM) circuit 148 are used to limit how quickly the supplied current changes. As shown in FIG. 2, the LRC circuit 145 is coupled to the comparator 143 to receive the comparator output signal 144. The DCM circuit is coupled to the LRC circuit through lines 145A and 145C, and to the reference signal generator 147 through line 149A. Together, the LRC and DCM circuits 145 and 148 operate to gradually and safely change the duty cycle of the output signal 144.

Referring to FIGS. 3A–D, operation of the LRC circuit 145 and DCM circuit 148 will be described. Beginning at time $T_0$, the sampled signal 141 operates within the system's nominal operating range. The comparator 143 produces a comparator output signal 144 having a duty cycle period 144A as shown in FIG. 3C. The comparator's duty cycle period 144A is supplied to the LRC circuit 145.

The LRC circuit 145 additionally receives a termination signal 145C from the DCM circuit 148. The termination signal 145C serves to define the maximum duty cycle period of the next occurring LRC output signal 146. By limiting the duty cycle period of the LRC output signal 146, the system prevents supplying a large amount of current to the electrical system which could stall the vehicle.

The termination signal 145C is transmitted to the LRC circuit 145 at a time $T_{max1}$ during each output period, as shown in FIG. 3C. As explained above, $T_{max1}$ defines the maximum duty cycle period of the next occurring LRC output signal 146. In the preferred embodiment, $T_{max1}$ is calculated as the duty cycle period of the previous LRC output signal 146 plus a predefined duration, the predefined duration corresponding to a safe increase in the current supplied to the electrical system. Thus, the duty cycle period of the LRC signal 146 can be made successively longer after each LRC output period, thereby allowing a successive increase in the amount of current supplied to the electrical system when needed.

In an alternative embodiment, two termination signals are sent: a first termination signal sent at time $T_{min}$ defining the minimum duty cycle period and a second termination signal sent at time $T_{max1}$ defining the aforementioned maximum duty cycle period. The minimum duty cycle period represents the shortest pulse width during the next occurring output period, and serves to act as a limit on how fast the current supplied to the electrical system may decrease from its existing level. If the comparator output signal 144 has a shorter duty cycle period than that defined by the minimum duty cycle period, the LRC circuit 145 extends the duty cycle period of the LRC output signal 146 to the first occurring termination signal $T_{min}$. $T_{min}$ is calculated as the duty cycle period of the last occurring LRC output signal 146 minus the aforementioned predefined duration, and can be successively decremented during subsequent output periods to gradually reduce the amount of output current supplied to the electrical system.

Upon receipt of the termination signal, the comparator's pulse width is terminated, if it has not already ended. The resulting signal is output as the LRC output signal 146.

The LRC circuit 145 then compares the duty cycle periods of the LRC output signal 146 and the comparator output signal 144. As shown in FIG. 3C between times $T_0$ and $T_1$, when the comparator's duty cycle period 144A terminates before the termination signal, the comparator's duty cycle period 144A is not altered. Thus, when the electrical system is operating in its nominal range, the comparator output signal 144A and the LRC output signal 146A are closely matched.

Beginning at time $T_1$, the sampled signal 141 falls below the nominal range, as shown in FIG. 3B. In response to the lower sampled voltage 141, the comparator 143 produces a longer duty cycle period 144B, as shown FIG. 3C. However, the longer duty cycle period 144B is beyond the termination signal. In this case, the termination signal truncates the comparator's output signal 144B, and the truncated duty cycle period is output as the LRC output signal 146B.

The longer duty cycle period of the LRC output signal activates the alternator 160 (FIG. 2) for a longer period of time resulting in additional current being supplied to the electrical system. The increased current supply raises the voltage level of the electrical system, and accordingly, the sampled signal 141, as shown in FIG. 3B.

Referring again to FIG. 2, when the comparator's duty cycle period 144B is truncated, the LRC circuit 145 sends a request via line 145A to extend the maximum duty cycle period for the next output period. Specifically, the LRC circuit transmits a request to delay the timing as to when the termination signal 148 is sent so that a longer duty cycle period is formed.

In response to the request, the DCM circuit 148 determines the termination time of the last LRC duty cycle 146A and to that time adds a delay, as described above. The delay represents the change in the amount of current which the system can safely handle. In the preferred embodiment, the delay is pre-programmed into the circuit 148. The termination signal is subsequently transmitted to the LRC circuit 145 at the new termination time $T_{max2}$, thereby allowing a longer maximum duty cycle period during the next occurring LRC output period $T_2$–$T_3$. In the alternative embodiment where two termination signals are transmitted and a minimum duty cycle period is formed, the first and second termination signals are delayed an equal amount so that the new $T_{min}$ and $T_{max2}$ are symmetrically centered around the previous LRC duty cycle end point.

During the next output period $T_2$–$T_3$, the extended maximum duty cycle period defined by $T_{max2}$ allows a longer LRC output signal duty cycle period. The longer duty cycle period allows a larger amount of current to be supplied to electrical system than supplied during the previous period. The increased current results in an increased system voltage and sampled voltage 141. If the termination signal is again transmitted before the conclusion of the duty cycle period of the comparator output signal 144C, a new termination time is generated $T_{max3}$, in the same manner described above.

A large change in the sampled signal 141 may require two or more iterations before regulation of the electrical system is complete. In the illustrated example of FIG. 3B, three time periods are required to gradually increase the supplied current and the sampled signal 141 back to its nominal operating range.

In the alternative embodiment, the LRC and DCM circuits 145 and 148 operate in the same way to gradually decrease the current supplied to the electrical system. When the sampled voltage 141 at time increases sharply, perhaps due to the de-activation of an accessory, the comparator 143 produces a comparator signal 144 having a shortened duty cycle period 144C.

The comparator's shortened pulse width terminates before the DCM circuit transmits the first occurring termination signal $T_{min}$ which defines the minimum duty cycle period for the next output period. The LRC circuit 148 detects the termination of the comparator's output signal 146 but outputs an extended duty cycle period signal corresponding to the duty cycle period defined by the first occurring termination signal $T_{min}$.

When the LRC circuit detects an earlier occurring termination of the comparator's duty cycle, it transmits a request to decrease the duty cycle period on the next output period. The DCM circuit 148 responds to the request by transmitting an earlier termination signal $T_{newmin}$, the time difference being a predefined duration corresponding to a safe reduction in current supplied to the electrical system. In this embodiment, the second occurring termination time $T_{max}$ is transmitted earlier by the same amount of time.

Figure 4:
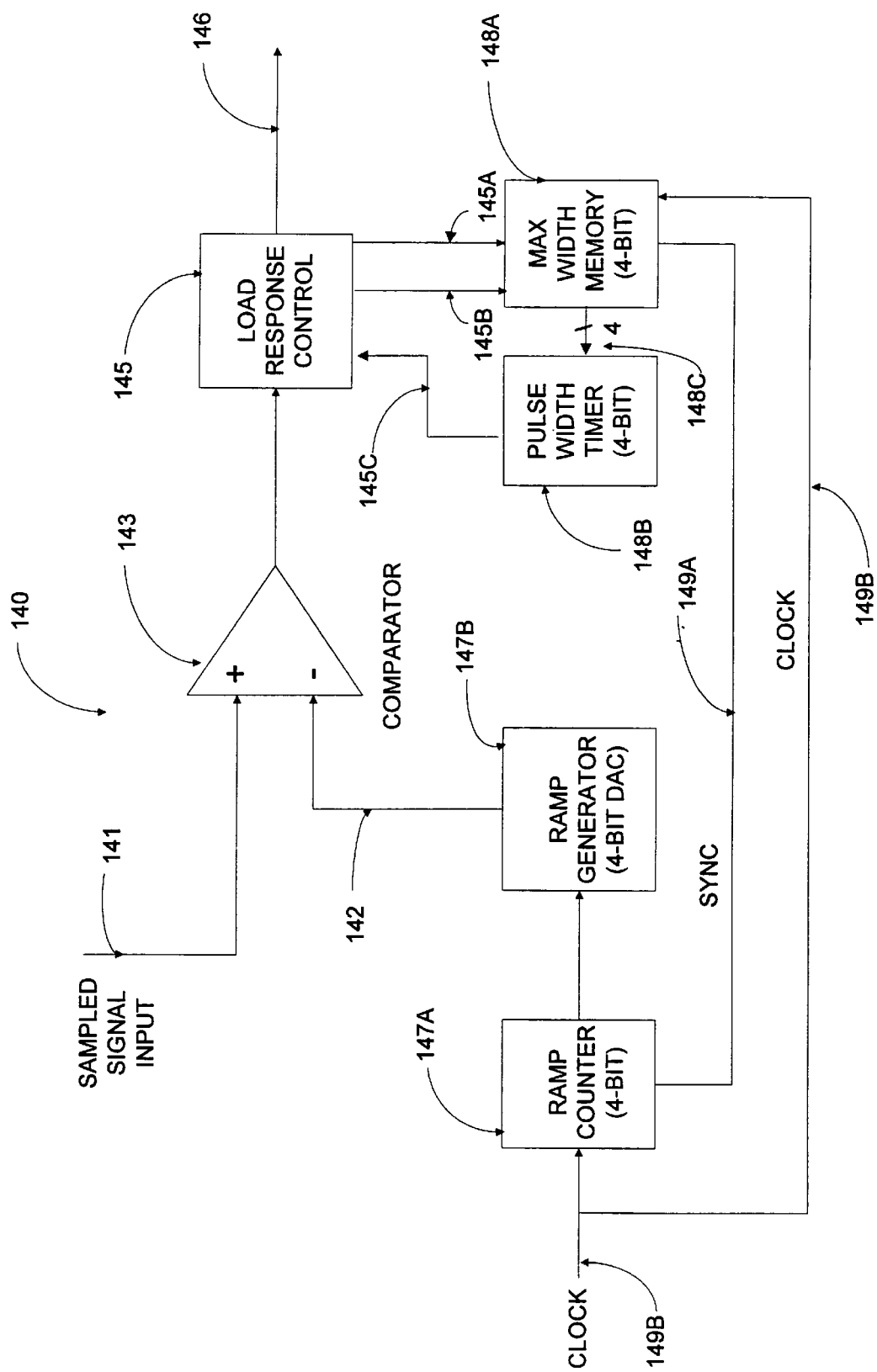
FIG. 4 shows a detailed schematic of the voltage regulator shown in FIG. 2.

FIG. 4 illustrates one embodiment of the voltage regulator circuit of FIG. 2. The comparator and LRC circuits 143 and 145 are as shown in FIG. 2. The reference signal generator 147 of FIG. 2 is shown as a digital ramp counter 147A and a ramp generator 147B. A clock signal 149A activates the digital ramp counter 147A to generate an increasing binary output stream. The output stream is transmitted to the ramp generator 147B which operates as a digital to analog converter, converting the increasing binary output stream to the analog ramp signal shown in FIG. 3A. While the ramp counter 147A and the ramp generator 147B may each process N-bits, each are 4-bit circuits in the preferred embodiment.

Additionally, the DCM circuit 148 of FIG. 2 is realized as a pulse width memory (PWM) circuit 148A and a pulse width timer (PWT) circuit 148B. The PWT circuit 148A receives the requests from the LRC circuit 145 to increase of decrease the next occurring duty cycle period. In the preferred embodiment, a first line 145A is used to transmit a request for increasing while a second line 145B is used to transmit a request for decreasing the subsequent duty cycle period.

Based upon the received request and the termination time of the last occurring LRC duty cycle, the PWM circuit 148A calculates an updated termination time. The PWM circuit 148A operates at the same clock frequency and is synchronized with the ramp counter through lines 149B and 149A, respectively.

The updated termination time is loaded into the PWT circuit 148B via line 148C. The PWT circuit counts down the termination time and transmits, via bus 145C, the termination signal when the termination time elapses, thereby forming the maximum duty cycle period. The PWM and PWT circuits 148A and 148B each may be N-bit wide circuits, but are 4-bit register circuits in the preferred embodiment.

Because the vehicle's engine is electronically very noisy, transient noise may propagate along the sampled signal input line. Once received at the sampled signal input port of the comparator 143, the transient noise will produce a randomly varying pulse width modulated signal, which, in turn will cause the current supplied to the electrical system to fluctuate randomly.

Figure 5:
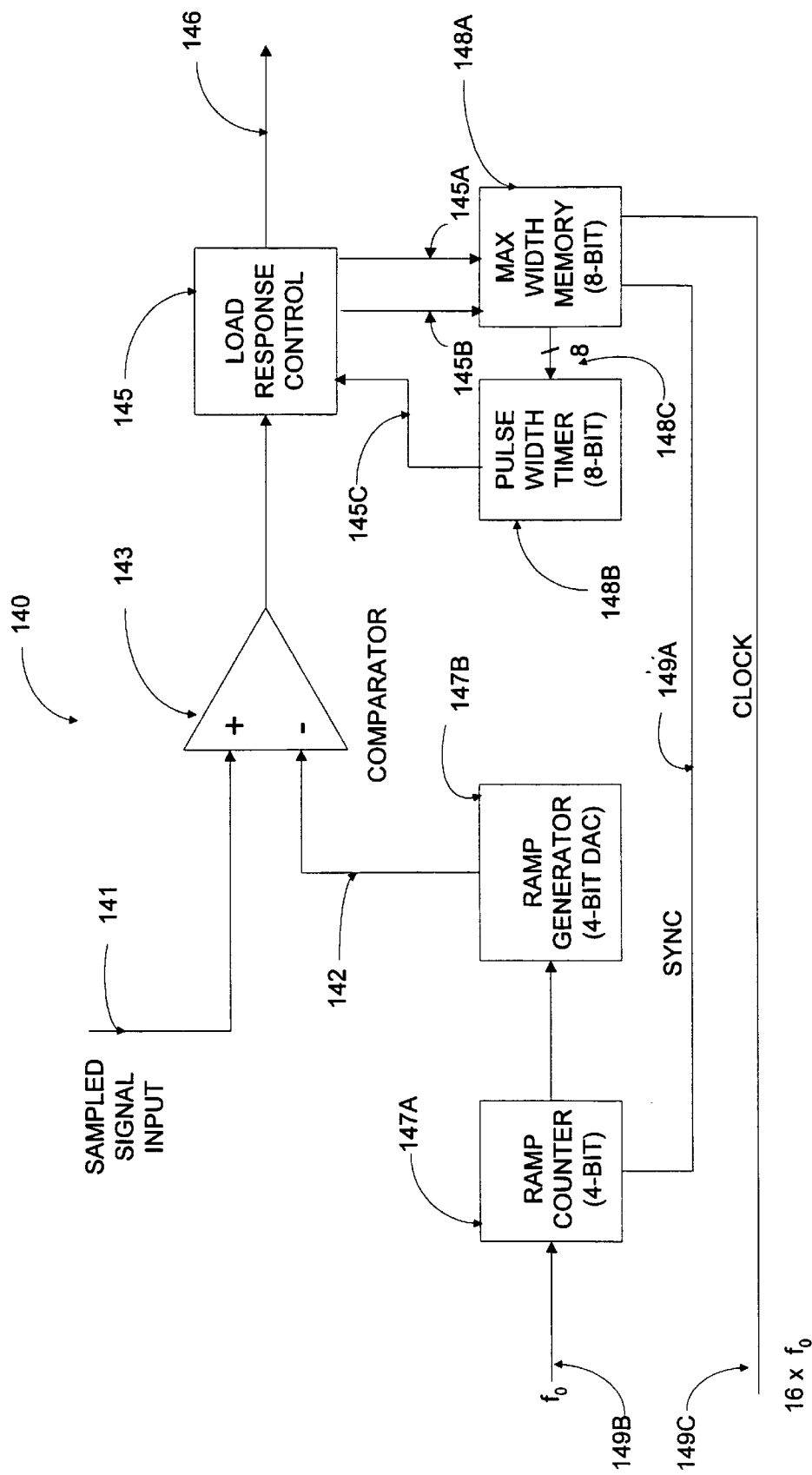
FIG. 5 shows one embodiment of the voltage regulator in accordance with the invention.

FIG. 5 shows a second embodiment of the voltage regulator system shown in FIG. 2. The circuit's overall structure remains as shown in FIG. 4, and in particular, the ramp generator 147A remains as a 4-bit DAC. The 4-bit PWM and PWT circuits 148A and 148B are upgraded with 8-bit circuits. A separate clock 149C operates at a higher frequency to adequately sample the 8-bit data. The upgraded 8-bit PWM and PWT circuits are slightly more expensive but substantially increase the voltage regulator's noise immunity.

The duty cycle period of each LRC output signal consists of n samples, each of which is $\frac{1}{2}^n$ in duration, where n is the number of bits of the PWM and PWT circuits 148A and 148B, respectively. Thus, as n increases, the duty cycle period is divided into a smaller number of increasing samples. Given its high frequency nature, transient noise will occur over a relatively small number of samples. Thus, by increasing the number of samples, a larger portion of the duty cycle period remains noise free. As a result, the voltage regulator exhibits a higher immunity to noise. Thus, improved noise immunity is achieved relatively inexpensively by using a higher resolution bit counter (PWT circuit 148A) and memory (PWM circuit 148B), without the need for a higher precision and substantially more expensive DAC (ramp generator 147A).

While the above is a complete description of the preferred embodiments of the invention, various alternatives modifications and equivalence may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A voltage regulator circuit for controlling the voltage of level of an electrical system, the voltage regulator comprising:

a reference counter for producing a binary output stream;

a reference generator coupled to said reference counter, said reference generator converting said binary stream to a reference signal;

a comparator having a sampled signal input for monitoring the voltage level of the electrical system, a second input for receiving said reference signal, and an output, said comparator producing a pulse width modulated signal having a first duty cycle period;

a pulse width timer circuit for transmitting a termination signal at a predefined termination time; and a load response control circuit having a signal input coupled to said comparator, a control input coupled to said pulse width timer, and a signal output, said load response control circuit receiving said pulse width modulated signal and said termination signal, wherein if said termination signal is received before the conclusion of said first duty cycle period, said load response control circuit truncates said first duty cycle period to end at said termination time, wherein said pulse width timer has greater digital resolution than said reference generator.

2. The voltage regulator of claim 1, further comprising a pulse width memory having an input coupled to said load response control circuit and an output coupled to said pulse width timer circuit, wherein if said load response control circuit truncates said first duty cycle period, said load response control circuit transmits a request to said pulse width memory circuit to calculate a new termination time, said pulse width memory generating a new termination time in response to said request, and transmitting said termination time to said pulse width timer circuit, and further wherein said pulse width memory has greater digital resolution than said reference generator.

3. The voltage regulator circuit of claim 2, further comprising:
    a first clock source coupled to said reference counter and said reference generator; and
    a second clock source coupled to said pulse width timer, wherein said second clock source operates at a higher frequency than said first clock source.

4. The voltage regulator circuit of claim 3, wherein said reference generator comprises a 4-bit digital to analog converter and said pulse width timer and said pulse width memory each comprise 8-bit digital circuits.

5. The voltage regulator circuit of claim 4, wherein said second clock source operates at sixteen times the frequency of the first clock source.

6. In a voltage regulator circuit, a method for reducing the effects of noise occurring on a sampled signal input, the method comprising the steps of:
    providing a digital stream;
    converting at a first sampling rate, using a digital to analog converter, said digital stream to a reference signal;
    comparing said reference signal with said sampled signal;
    generating a pulse width modulated signal in response to said comparison, said pulse width modulated signal having a duty cycle period;
    sampling said duty cycle period at a second sampling rate to produce an output signal, wherein said second sampling rate is higher than said first sampling rate.

7. The method of claim 6, further comprising the single step of modulating said duty cycle period of said pulse width modulated signal.

8. The method of claim 7, wherein said step of modulating comprises the steps of:
    receiving a termination signal;
    truncating said duty cycle period upon receipt of said termination signal if said termination signal is received before the end of said duty cycle period; and
    transmitting a request to delay the transmission of a subsequent termination signal.

9. The method of claim 8, further comprising the steps of:
    calculating a new transmission time for said subsequent termination signal;
    supplying said termination time to a counter;
    decrementing said counter until said termination time elapses; and
    transmitting said termination time.

10. The method of claim 9, further comprising the steps of:

controlling said step of converting using a first clock source; and
controlling said steps of calculating, supplying, decrementing, and transmitting said termination time using a second clock source, wherein said second clock source operates at a higher frequency than said first clock source.

11. A voltage regulator circuit for controlling the voltage of level of an electrical system, the voltage regulator comprising:
    a first clock source;
    a reference signal generator having an input coupled to said first clock source, and a signal output, said reference signal generator providing a reference signal
    a comparator having a sampled signal input for monitoring the voltage level of the electrical system, a second input for receiving said reference signal, and an output, said comparator producing a pulse width modulated signal having a first duty cycle period;
    a second clock source operating at a higher frequency than said first clock source; and
    a sampling circuit having a first input for receiving said pulse width modulated signal, a signal output and a clock signal input coupled to said second clock source, said sampling circuit modulating said first duty cycle period of said pulse width modulated signal at said higher frequency using said second clock source.

12. The voltage regulator of claim 1, wherein if said termination signal is received after the conclusion of said first duty cycle period, said first duty cycle period is not truncated.

13. The voltage regulator of claim 12, further comprising a pulse width memory circuit having an input coupled to said load response control circuit and an output coupled to said pulse width timer circuit, wherein if said load response control circuit transmits said termination signal after said conclusion of said first duty cycle period plus a predetermined time, said pulse width memory circuit generates a new termination time in response, and transmits said new termination time to said pulse width timer circuit.

14. The voltage regulator of claim 11, wherein said sampling circuit comprises:
    a pulse width timer circuit coupled to said second clock source for transmitting a termination signal at a predefined termination time; and
    a load response control circuit having a signal input coupled to said comparator, a control input coupled to said pulse width timer, and a signal output, said load response control circuit receiving said pulse width modulated signal and said termination signal, wherein if said termination signal is received before the conclusion of said first duty cycle period, said load response control circuit truncates said first duty cycle period to end at said termination time.

15. The voltage regulator of claim 14, wherein said sampling circuit further comprises a pulse width memory circuit having a first input coupled to said load response control circuit, a clock signal input coupled to said second clock source, and an output coupled to said pulse width timer circuit, wherein if said load response control circuit truncates said first duty cycle period, said pulse width memory circuit generates a new termination time in response, and transmits said termination time to said pulse width timer circuit.

16. The voltage regulator of claim 15, wherein said pulse width memory circuit and said pulse width timer circuit each comprise 8 bit circuitry and said reference signal generator comprises 4 bit circuitry.

17. The voltage regulator of claim 16, wherein said second clock source operates at a frequency sixteen times higher than said first clock source.

18. The voltage regulator of claim 17, wherein said first duty cycle period comprises n samples, each lasting $2^{-n}$ in duration, wherein n comprises the number of bits of said pulse with timer circuit.

* * * * *